United States Patent
Goto et al.

(10) Patent No.: US 12,480,797 B2
(45) Date of Patent: Nov. 25, 2025

(54) FUEL CALCULATION DEVICE, FUEL CALCULATION METHOD, AND PROGRAM

(71) Applicant: MITSUBISHI HEAVY INDUSTRIES, LTD., Tokyo (JP)

(72) Inventors: Hiroki Goto, Tokyo (JP); Takamasa Maruyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 313 days.

(21) Appl. No.: 18/035,857

(22) PCT Filed: Jan. 7, 2022

(86) PCT No.: PCT/IB2022/050105
§ 371 (c)(1),
(2) Date: May 8, 2023

(87) PCT Pub. No.: WO2022/101891
PCT Pub. Date: May 19, 2022

(65) Prior Publication Data
US 2023/0400338 A1 Dec. 14, 2023

(51) Int. Cl.
*G01F 9/00* (2006.01)
*B64D 37/00* (2006.01)

(52) U.S. Cl.
CPC .............. *G01F 9/00* (2013.01); *B64D 37/00* (2013.01)

(58) Field of Classification Search
CPC ........ G01F 9/00; G01F 23/263; G01F 15/075; G01F 9/008; B64D 37/00; B64D 43/00;
(Continued)

(56) References Cited

U.S. PATENT DOCUMENTS

2003/0136173 A1 7/2003 Elenich et al.
2015/0344148 A1 12/2015 Schwartz et al.

FOREIGN PATENT DOCUMENTS

| EP | 2 840 240 | 2/2015 |
|----|-----------|--------|
| JP | 2008-174193 | 7/2008 |

(Continued)

OTHER PUBLICATIONS

Written Opinion issued Mar. 1, 2022 in International (PCT) Application No. PCT/IB2022/050105, with English-language translation.

(Continued)

*Primary Examiner* — Timothy P Graves
(74) *Attorney, Agent, or Firm* — Wenderoth, Lind & Ponack, L.L.P.

(57) ABSTRACT

This fuel calculation device comprises: a remaining fuel amount calculation unit that periodically calculates and stores an approximate value of the remaining fuel amount on the basis of the measurement value of the remaining fuel amount remaining in a fuel container, and the fuel flow rate of fuel supplied from the fuel container; a failure determination unit that determines whether a remaining fuel amount meter that outputs the measurement value of the remaining fuel amount has failed; and a display control unit that controls so as to display the measurement value of the remaining fuel amount when the remaining fuel amount meter has not failed, and to display the approximate value of the remaining fuel amount when the remaining fuel amount meter has failed.

5 Claims, 3 Drawing Sheets

(58) Field of Classification Search
CPC . B64D 45/00; F23N 5/18; F23N 5/265; F23N 2005/185; F23N 5/242
See application file for complete search history.

(56) References Cited

FOREIGN PATENT DOCUMENTS

| JP | 2009-8416 | 1/2009 | | |
|---|---|---|---|---|
| JP | 2009008416 A | * | 1/2009 | ............ G01F 23/60 |
| JP | 6474317 | 2/2019 | | |
| WO | 2013/157095 | 10/2013 | | |

OTHER PUBLICATIONS

International Search Report Issued Mar. 1, 2022 in International (PCT) Application No. PCT/IB2022/050105, with English-language translation.
Extended European Search Report issued May 15, 2024 in European Patent Application No. 22723001.8.

* cited by examiner

FUEL CALCULATION DEVICE, FUEL CALCULATION METHOD, AND PROGRAM

TECHNICAL FIELD

The present disclosure relates to a fuel calculation device, a fuel calculation method, and a program.

BACKGROUND ART

In general, an aircraft includes a plurality of divided fuel tanks; a fuel gauge that measures a remaining fuel amount in each fuel tank; and a computer that monitors and controls the remaining fuel amount in each fuel tank in flight based on a measured value obtained by the fuel gauge. Japanese Patent No. 6474317 discloses a method for predicting a remaining fuel amount that is likely to remain at a current destination based on a fuel usage pattern.

When a failure has occurred in the fuel gauge, for example, when an instrument does not display or when the accuracy of a display decreases, there is a possibility that a pilot or the like cannot accurately assess a remaining fuel amount in the fuel tank and the safety of the aircraft decreases.

The present disclosure is conceived in view of the foregoing circumstances, and an object of the present disclosure is to provide a fuel calculation device, a fuel calculation method, and a program that can accurately assess a remaining fuel amount even when a fuel gauge has failed.

Solution to Problem

According to the present disclosure, there is provided a fuel calculation device including: a remaining fuel amount calculation unit that periodically calculates and stores an estimated value of a remaining fuel amount remaining in a fuel container based on a measured value of the remaining fuel amount and a fuel flow rate of fuel supplied from the fuel container; a failure determination unit that determines whether or not a fuel gauge that outputs the measured value of the remaining fuel amount is in failure; and a display control unit that performs control to cause the measured value of the remaining fuel amount to be displayed when the fuel gauge is not in failure, and to cause the estimated value of the remaining fuel amount to be displayed when the fuel gauge is in failure.

In addition, according to the present disclosure, there is provided a fuel calculation method including: a step of periodically calculating and storing an estimated value of a remaining fuel amount remaining in a fuel container based on a measured value of the remaining fuel amount and a fuel flow rate of fuel supplied from the fuel container; a step of determining whether or not a fuel gauge that outputs the measured value of the remaining fuel amount is in failure; and a step of causing the measured value of the remaining fuel amount to be displayed when the fuel gauge is not in failure, and causing the estimated value of the remaining fuel amount to be displayed when the fuel gauge is in failure.

In addition, according to the present disclosure, there is provided a program causing a computer that operates as a fuel calculation device, to execute: a step of periodically calculating and storing an estimated value of a remaining fuel amount remaining in a fuel container based on a measured value of the remaining fuel amount and a fuel flow rate of fuel supplied from the fuel container; a step of determining whether or not a fuel gauge that outputs the measured value of the remaining fuel amount is in failure; and a step of causing the measured value of the remaining fuel amount to be displayed when the fuel gauge is not in failure, and causing the estimated value of the remaining fuel amount to be displayed when the fuel gauge is in failure.

Advantageous Effects of Invention

According to the present disclosure, it is possible to provide the fuel calculation device, the fuel calculation method, and the program that can accurately assess a remaining fuel amount even when the fuel gauge has failed.

DESCRIPTION OF EMBODIMENTS

Hereinafter, a fuel calculation device, a fuel calculation method, and a program according to an embodiment of the present disclosure will be described in detail with reference to the drawings. The present disclosure is not limited to the description of the following embodiment. In addition, components in the following embodiment include components that can be easily replaced by those skilled in the art, components that are substantially the same, or components that fall within an equivalent range. Further, the components described below can be variously omitted, replaced, and modified without departing from the concept of the present disclosure. In the following embodiment, components required for illustrating the fuel calculation device, the fuel calculation method, and the program according to the embodiment of the present disclosure will be described, and the description of other components will be omitted. In the description of the following embodiment, the same configurations are denoted by the same reference signs, and different configurations are denoted by different reference signs.

Embodiment

Figure 1:
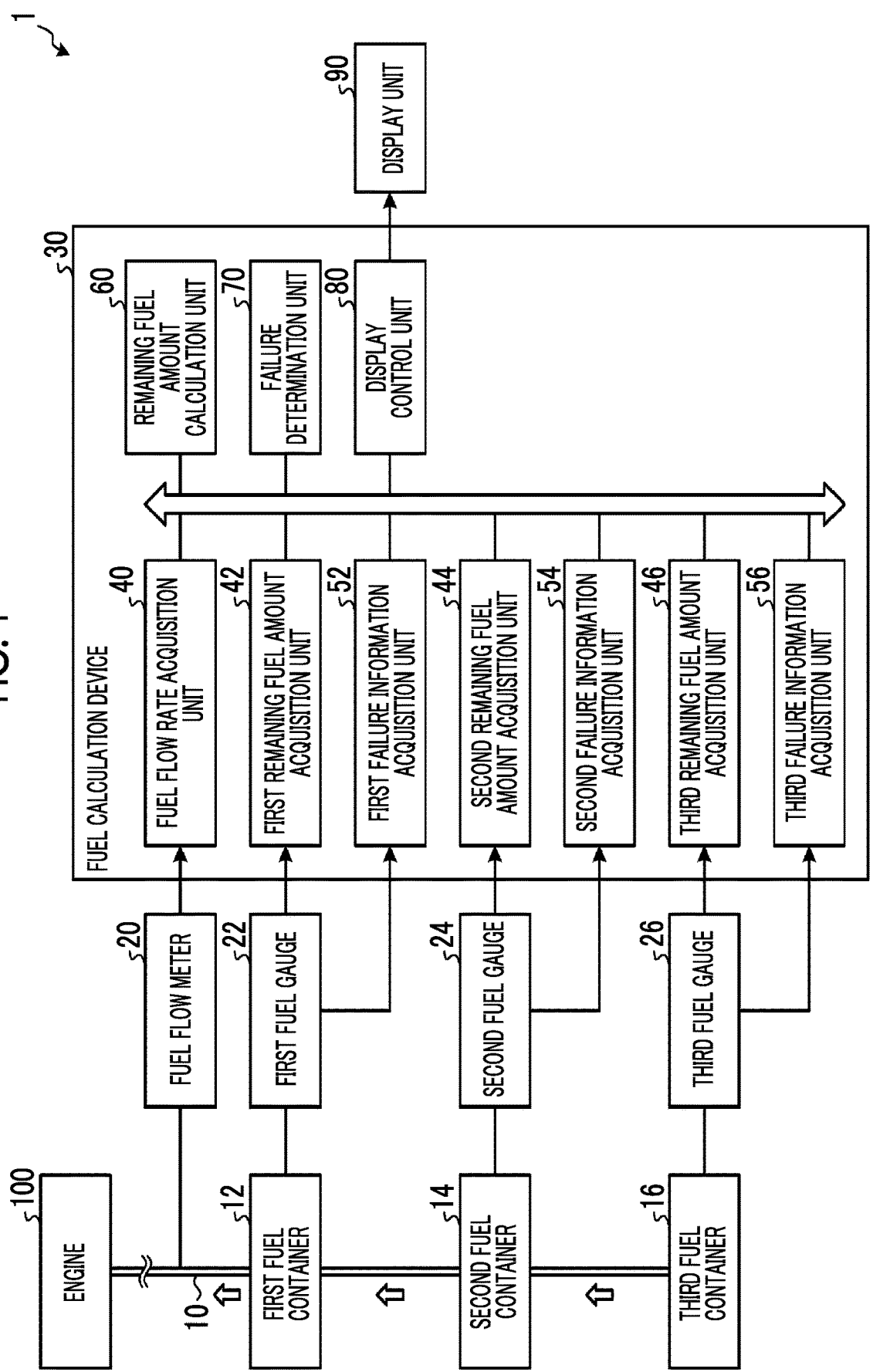
FIG. 1 is a block diagram illustrating one example of a fuel management system including a fuel calculation device according to an embodiment.
Figure 2:
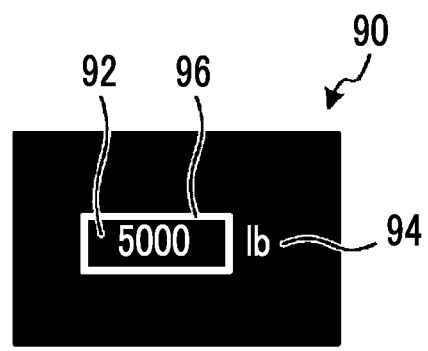
FIG. 2 is a view illustrating one example of a display screen of a display unit during normal display.
Figure 3:
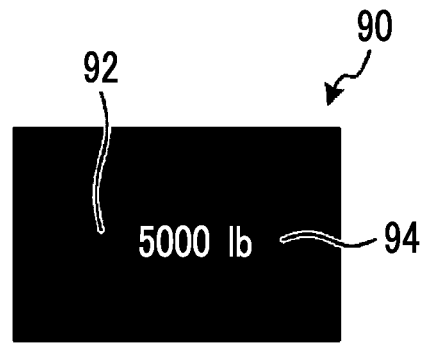
FIG. 3 is a view illustrating one example of a display screen of the display unit during backup display.

First, a configuration of a fuel management system 1 including a fuel calculation device 30 of the embodiment will be described with reference to FIGS. 1 to 3. FIG. 1 is a block diagram illustrating one example of the fuel management system 1 including the fuel calculation device according to the embodiment. FIG. 2 is a view illustrating one example of a display screen of a display unit 90 during normal display. FIG. 3 is a view illustrating one example of a display screen of the display unit 90 during backup display. The normal display and the backup display will be described later.

In the embodiment, the fuel management system 1 is a system that manages fuel mounted in an aircraft or the like. The fuel management system 1 includes a supply line a first fuel container 12, a second fuel container 14, a third fuel container 16, a fuel flow meter 20, a first fuel gauge 22, a second fuel gauge 24, a third fuel gauge 26, the fuel calculation device 30, and the display unit 90.

The supply line 10 is a line that supplies the fuel in the first fuel container 12, the fuel in the second fuel container 14, and the fuel in the third fuel container 16 to an engine 100. The supply line 10 connects the first fuel container 12, the second fuel container 14, and the third fuel container 16 in series, and also connects the first fuel container 12 and the engine 100 of the aircraft. In the embodiment, the fuel management system 1 includes three fuel containers including the first fuel container 12, the second fuel container 14, and the third fuel container 16, but may include one, two, or four or more fuel containers.

The first fuel container 12 of the embodiment is provided downstream of the second fuel container 14 and the third fuel container 16 in the supply line 10. The remaining fuel amount in the first fuel container 12 decreases as the fuel is supplied to the engine 100 in a state where the remaining fuel amounts in the second fuel container 14 and the third fuel container 16 are zero.

The second fuel container 14 of the embodiment is provided upstream of the first fuel container 12 and downstream of the third fuel container 16 in the supply line 10. The remaining fuel amount in the second fuel container 14 decreases as the fuel is supplied to the engine 100 in a state where the remaining fuel amount in the third fuel container 16 is zero.

The third fuel container 16 of the embodiment is provided upstream of the first fuel container 12 and the second fuel container 14 in the supply line 10. The remaining fuel amount in the third fuel container 16 decreases as the fuel is supplied to the engine 100. Namely, when the fuel is supplied to the engine 100 in the supply line 10, first, the remaining fuel amount in the third fuel container 16 decreases, and when the remaining fuel amount in the third fuel container 16 becomes zero, the remaining fuel amount in the second fuel container 14 starts to decrease, and further, when the remaining fuel amount in the second fuel container 14 becomes zero, the remaining fuel amount in the first fuel container 12 starts to decrease.

The fuel flow meter 20 measures a fuel flow rate supplied from the supply line 10 to the engine 100. The fuel flow meter 20 measures a fuel flow rate supplied from the supply line 10 to the engine 100, for example, by detecting a rotation generated when the fuel flows through a flow path, by means of a propeller provided in the flow path. The fuel flow meter 20 is provided at a predetermined position downstream of the first fuel container 12 in the supply line 10. More specifically, the fuel flow meter 20 is provided further downstream of the first fuel container 12 provided at the most downstream among a plurality of fuel containers (the first fuel container 12, the second fuel container 14, and the third fuel container 16) in the supply line 10. The fuel flow meter 20 outputs an information signal of the measured value of the measured fuel flow rate to the fuel calculation device 30.

The first fuel gauge 22 measures a remaining fuel amount in the first fuel container 12 for example, by measuring a capacitance corresponding to a fuel level position through a capacitance method. The first fuel gauge 22 outputs an information signal of the measured value of the measured remaining fuel amount in the first fuel container 12 to the fuel calculation device 30.

The second fuel gauge 24 measures a remaining fuel amount in the second fuel container 14. Similarly to the first fuel gauge 22, the second fuel gauge 24 measures the remaining fuel amount remaining in the second fuel container 14, for example, by measuring a capacitance corresponding to a fuel level position through a capacitance method. The second fuel gauge 24 outputs an information signal of the measured value of the measured remaining fuel amount in the second fuel container 14 to the fuel calculation device 30.

The third fuel gauge 26 measures a remaining fuel amount in the third fuel container 16. Similarly to the first fuel gauge 22 and the second fuel gauge 24, the third fuel gauge 26 measures the remaining fuel amount remaining in the third fuel container 16, for example, by measuring a capacitance corresponding to a fuel level position through a capacitance method. The third fuel gauge 26 outputs an information signal of the measured value of the measured remaining fuel amount in the third fuel container 16 to the fuel calculation device 30.

In the embodiment, the fuel calculation device 30 is implemented as one of the functions of the fuel management system 1. The fuel calculation device 30 includes a storage device that stores various control programs and data used for various control processes, and a calculation processing device that executes a control program determined in advance. The storage device is, for example, a non-volatile or volatile semiconductor memory such as a read only memory (ROM), a random access memory (RAM), a hard disk drive (HDD), or a flash memory, a magnetic disk, a flexible disk, an optical disk, a compact disk, a mini disk, or a DVD. The calculation processing device is, for example, a central processing unit (CPU), a microcontroller unit (MCU), a microprocessor, a microcomputer, a digital signal processor (DSP), or a system large scale integration (LSI). The fuel calculation device 30 is implemented with one storage device or a plurality of storage devices and one calculation processing device or a plurality of calculation processing devices.

The fuel calculation device 30 calculates remaining fuel amounts remaining in the first fuel container 12, the second fuel container 14, and the third fuel container 16, and causes the display unit 90 to display the remaining fuel amounts. In the embodiment, the fuel calculation device 30 includes a fuel flow rate acquisition unit 40, a first remaining fuel amount acquisition unit 42, a second remaining fuel amount acquisition unit 44, a third remaining fuel amount acquisition unit 46, a first failure information acquisition unit 52, a second failure information acquisition unit 54, a third failure information acquisition unit 56, a remaining fuel amount calculation unit 60, a failure determination unit 70, and a display control unit 80.

The fuel flow rate acquisition unit 40 acquires a measured value of a fuel flow rate of the fuel supplied to the engine 100. More specifically, the fuel flow rate acquisition unit 40 acquires the measured value of the fuel flow rate measured by the fuel flow meter 20. The fuel flow rate acquisition unit 40 acquires measured values of fuel flow rates at predetermined intervals. The fuel flow rate acquisition unit 40 outputs information of the measured value of the acquired fuel flow rate to the remaining fuel amount calculation unit 60.

The first remaining fuel amount acquisition unit 42 acquires a measured value of the remaining fuel amount in the first fuel container 12. More specifically, the first remaining fuel amount acquisition unit 42 acquires the measured value of the remaining fuel amount in the first fuel container 12 measured by the first fuel gauge 22. The first remaining fuel amount acquisition unit 42 acquires measured values of remaining fuel amounts in the first fuel container 12 at predetermined intervals. The first remaining fuel amount acquisition unit 42 outputs information of the measured value of the acquired remaining fuel amount in the first fuel container 12 to the remaining fuel amount calculation unit 60.

The second remaining fuel amount acquisition unit 44 acquires a measured value of the remaining fuel amount in the second fuel container 14. More specifically, the second remaining fuel amount acquisition unit 44 acquires the measured value of the remaining fuel amount in the second fuel container 14 measured by the second fuel gauge 24. The second remaining fuel amount acquisition unit 44 acquires measured values of remaining fuel amounts in the second fuel container 14 at predetermined intervals. The second remaining fuel amount acquisition unit 44 outputs information of the measured value of the acquired remaining fuel amount in the second fuel container 14 to the remaining fuel amount calculation unit 60.

The third remaining fuel amount acquisition unit 46 acquires a measured value of the remaining fuel amount in the third fuel container 16. More specifically, the third remaining fuel amount acquisition unit 46 acquires the measured value of the remaining fuel amount in the third fuel container 16 measured by the third fuel gauge 26. The third remaining fuel amount acquisition unit 46 acquires measured values of remaining fuel amounts in the third fuel container 16 at predetermined intervals. The third remaining fuel amount acquisition unit 46 outputs information of the measured value of the acquired remaining fuel amount in the third fuel container 16 to the remaining fuel amount calculation unit 60.

The first failure information acquisition unit 52 acquires failure diagnosis information indicating diagnosis information regarding whether or not the first fuel gauge 22 is in failure. The determination of a failure of the first fuel gauge 22 is performed by a known method. The failure of the first fuel gauge 22 indicates, for example, a state where a phenomenon such as the first remaining fuel amount acquisition unit 42 not being able to detect information signal from the first fuel gauge 22 or the value of the information signal being out of a predetermined range occurs. The first failure information acquisition unit 52 outputs the acquired failure diagnosis information to the failure determination unit 70.

The second failure information acquisition unit 54 acquires failure diagnosis information indicating diagnosis information regarding whether or not the second fuel gauge 24 is in failure. The determination of a failure of the second fuel gauge 24 is performed by a known method. The failure of the second fuel gauge 24 indicates, for example, a state where a phenomenon such as the second remaining fuel amount acquisition unit 44 not being able to detect information signal from the second fuel gauge 24 or the value of the information signal being out of a predetermined range occurs. The second failure information acquisition unit 54 outputs the acquired failure diagnosis information to the failure determination unit 70.

The third failure information acquisition unit 56 acquires failure diagnosis information indicating diagnosis information regarding whether or not the third fuel gauge 26 is in failure. The determination of a failure of the third fuel gauge 26 is performed by a known method. The failure of the third fuel gauge 26 indicates, for example, a state where a phenomenon such as the third remaining fuel amount acquisition unit 46 not being able to detect information signal from the third fuel gauge 26 or the value of the information signal being out of a predetermined range occurs. The third failure information acquisition unit 56 outputs the acquired failure diagnosis information to the failure determination unit 70.

The remaining fuel amount calculation unit 60 periodically calculates and temporarily stores estimated values of remaining fuel amounts in the first fuel container 12, the second fuel container 14, and the third fuel container 16. The current estimated values of the remaining fuel amounts are estimated values for backup to assess the remaining fuel amounts even when at least one of the first fuel gauge 22, the second fuel gauge 24, and the third fuel gauge 26 has failed.

The remaining fuel amount calculation unit 60 acquires the measured value of the fuel flow rate from the fuel flow rate acquisition unit 40. The remaining fuel amount calculation unit 60 acquires the measured value of the remaining fuel amount in the first fuel container 12 from the first remaining fuel amount acquisition unit 42. The remaining fuel amount calculation unit 60 acquires the measured value of the remaining fuel amount in the second fuel container 14 from the second remaining fuel amount acquisition unit 44. The remaining fuel amount calculation unit 60 acquires the measured value of the remaining fuel amount in the third fuel container 16 from the third remaining fuel amount acquisition unit 46.

The remaining fuel amount calculation unit 60 calculates an integral value of the fuel flow rate based on the acquired measured value of the fuel flow rate and an interval at which the measured value of the fuel flow rate is acquired from the fuel flow rate acquisition unit 40. The remaining fuel amount calculation unit 60 calculates a total value of the measured values of the remaining fuel amounts based on the acquired measured value of the remaining fuel amount in each fuel container.

When none of the first fuel gauge 22, the second fuel gauge 24, and the third fuel gauge 26 is in failure, the remaining fuel amount calculation unit 60 calculates an estimated value of the remaining fuel amount by subtracting the integral value of the fuel flow rate from the total value of the measured values of the remaining fuel amounts. The remaining fuel amount calculation unit 60 temporarily stores the calculated estimated value of the remaining fuel amount. The remaining fuel amount calculation unit 60 executes the calculation of estimated values of remaining fuel amounts at predetermined intervals, updates and temporarily stores a newly calculated estimated value of the remaining fuel amount as a latest (current) estimated value of the remaining fuel amount.

When at least one of the first fuel gauge 22, the second fuel gauge 24, and the third fuel gauge 26 has failed, the remaining fuel amount calculation unit 60 recalculates an estimated value of the remaining fuel amount by subtracting the integral value of the fuel flow rate from the stored (previous) estimated value of the remaining fuel amount. The remaining fuel amount calculation unit 60 temporarily stores the recalculated (current) estimated value of the remaining fuel amount. The remaining fuel amount calculation unit 60 executes the recalculation of estimated values of remaining fuel amounts at predetermined intervals, and updates and temporarily stores a newly calculated estimated value of the remaining fuel amount as a latest estimated value of the remaining fuel amount.

The failure determination unit 70 determines a failure status of whether or not each of the first fuel gauge 22, the second fuel gauge 24, and the third fuel gauge 26 is in failure, based on the failure diagnosis information acquired by the first failure information acquisition unit 52, the second failure information acquisition unit 54, and the third failure information acquisition unit 56. The failure determination unit 70 outputs the determination result to the remaining fuel amount calculation unit 60 and the display control unit 80.

The display control unit 80 controls the display unit 90 to display a remaining fuel amount, based on the total value of the measured values of the remaining fuel amounts or the estimated value of the remaining fuel amount acquired from the remaining fuel amount calculation unit 60, and on the determination result acquired from the failure determination unit 70. The display control unit 80 causes the display unit 90 to display the remaining fuel amount through normal display or backup display. The normal display refers to displaying a measured value of the remaining fuel amount measured by each fuel gauge. The backup display refers to displaying an estimated value of the remaining fuel amount calculated by the remaining fuel amount calculation unit 60.

When none of the first fuel gauge 22, the second fuel gauge 24, and the third fuel gauge 26 is in failure, the display control unit 80 causes the display unit 90 to display the measured value of the remaining fuel amount through normal display. When at least one of the first fuel gauge 22, the second fuel gauge 24, and the third fuel gauge 26 has failed, the display control unit 80 causes the display unit 90 to display the estimated value of the remaining fuel amount through backup display.

The display unit 90 displays the total value of the remaining fuel amounts remaining in the fuel containers, based on a control signal output from the display control unit 80 of the fuel calculation device 30. The display unit 90 may separately display each remaining fuel amount remaining in each fuel container. The display unit 90 is included in, for example, an instrument mounted in a cockpit and disposed at a position visible to a pilot.

In the embodiment illustrated in FIGS. 2 and 3, the display unit 90 displays the remaining fuel amount in a digital manner. The display unit 90 is, for example, a display device including a display screen that displays various images such as visual notification information. The display device is, for example, a display device unique to the fuel management system 1, a display device shared with another system mounted in the cockpit, or the like. The display device is, for example, a display including a liquid crystal display (LCD), an organic electro-luminescence (EL) display, or the like. In the embodiment, the display unit 90 displays the remaining fuel amount in a digital manner, but may be, for example, an analog meter.

As illustrated in FIGS. 2 and 3, in the embodiment, the display unit 90 includes a remaining fuel amount display portion 92, a unit display portion 94, and a display format display portion 96. The remaining fuel amount display portion 92 is a region for displaying the total value of the measured values of the remaining fuel amounts or the estimated value of the remaining fuel amount. When the display unit 90 is in normal display, the total value of the measured values of the remaining fuel amounts is displayed in the remaining fuel amount display portion 92. When the display unit 90 is in backup display, the estimated value of the remaining fuel amount is displayed in the remaining fuel amount display portion 92. The unit display portion 94 is a region for displaying a physical unit of the remaining fuel amount displayed in the remaining fuel amount display portion 92.

The display format display portion 96 is a region for an identifier including characters, symbols, colors, or the like indicating whether the display unit 90 is in normal display or backup display. In the embodiment, the display format display portion 96 has a frame shape surrounding the remaining fuel amount display portion 92. In the embodiment, the display format display portion 96 displays a frame as illustrated in FIG. 2 when the display unit 90 is in normal display, and does not display a frame as illustrated in FIG. 3 when the display unit 90 is backup display. When the display unit 90 is an analog meter, whether the display unit 90 is in normal display or backup display may be indicated, for example, by changing the color or shape of a needle.

Figure 4:
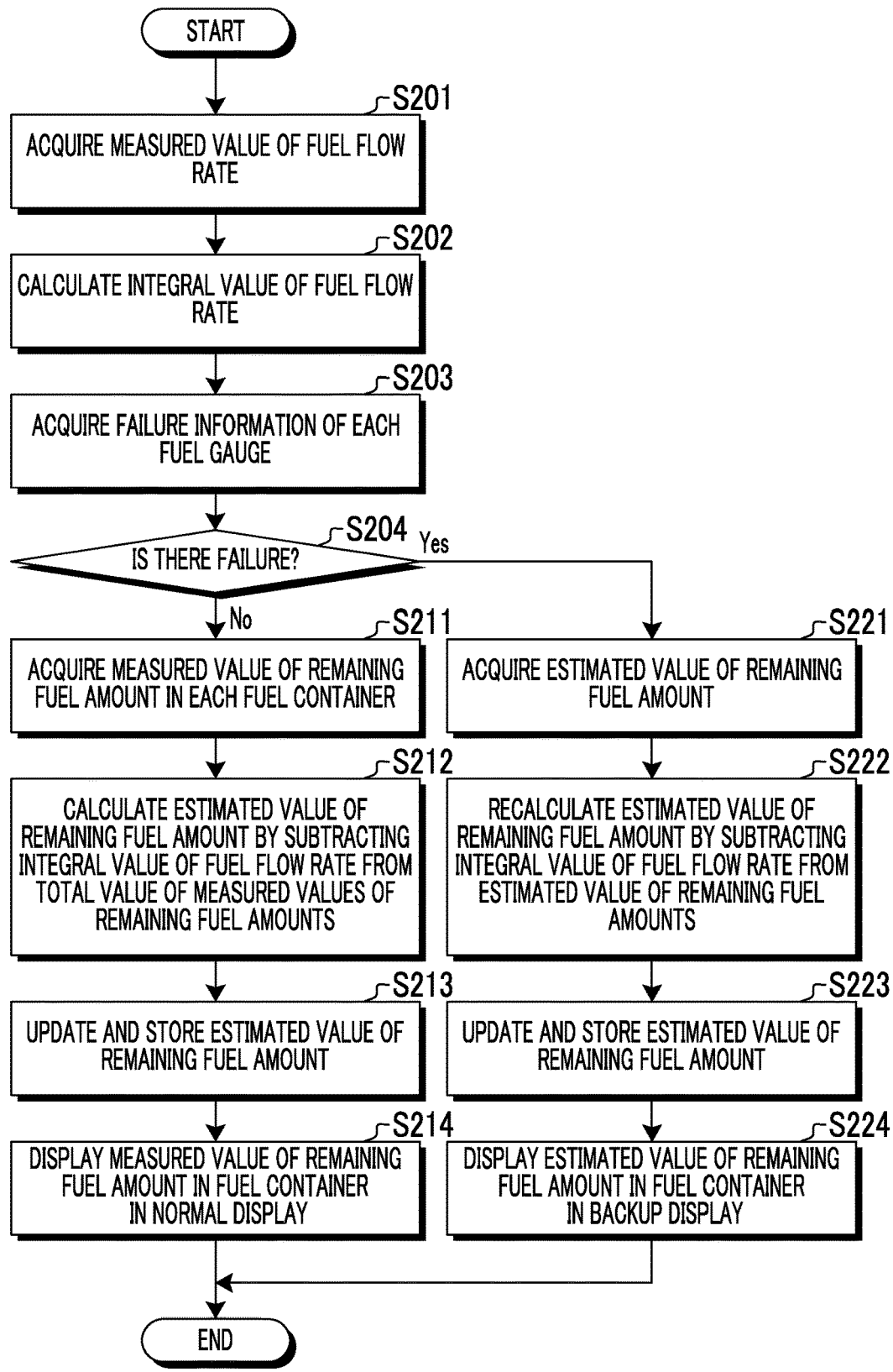
FIG. 4 is a flowchart illustrating one example of processing of the fuel calculation device according to the embodiment.

Next, a flow of processing in the fuel calculation device 30 according to the embodiment will be described with reference to FIG. 4. FIG. 4 is a flowchart illustrating one example of the processing of the fuel calculation device 30 according to the embodiment. The processing illustrated in FIG. 4 is executed by the fuel calculation device 30 based on the control program and data determined in advance. For example, when the engine 100 is started, the fuel calculation device 30 proceeds to step S201 illustrated in FIG. 4 and starts the processing. In addition, the processing illustrated in FIG. 4 is repeatedly executed from step S201 at predetermined intervals, for example, until the engine 100 is stopped, the supply of electric power is stopped, or a predetermined operation signal for ending the processing generated by an operation of the pilot or the like is received.

In step S201, the fuel calculation device 30 acquires a measured value of a fuel flow rate. Specifically, the fuel flow rate acquisition unit 40 acquires the measured value of the fuel flow rate measured by the fuel flow meter 20. The measured value of the fuel flow rate is output to the remaining fuel amount calculation unit 60. The fuel calculation device 30 proceeds to step S202.

In step S202, the fuel calculation device 30 calculates an integral value of the fuel flow rate. Specifically, the remaining fuel amount calculation unit 60 calculates the integral value of the fuel flow rate based on the measured value of the fuel flow rate acquired in step S201 and on the interval at which the measured value of the fuel flow rate is acquired. The fuel calculation device 30 proceeds to step S203.

In step S203, the fuel calculation device 30 acquires failure information of each fuel gauge. Specifically, the first failure information acquisition unit 52 acquires failure diagnosis information of the first fuel gauge 22. In addition, the second failure information acquisition unit 54 acquires failure diagnosis information of the second fuel gauge 24. In addition, the third failure information acquisition unit 56 acquires failure diagnosis information of the third fuel gauge 26. The failure diagnosis information of each fuel gauge is output to the failure determination unit 70. The fuel calculation device 30 proceeds to step S204.

In step S204, the fuel calculation device 30 determines whether or not there is a failure in each fuel gauge. Specifically, the failure determination unit 70 determines a failure status of whether or not each of the first fuel gauge 22, the second fuel gauge 24, and the third fuel gauge 26 is in failure, based on the failure diagnosis information acquired in step S203. The failure determination unit 70 outputs the determination result to the remaining fuel amount calculation unit 60 and the display control unit 80.

When there is no failure in the fuel gauges (step S204: No), the fuel calculation device 30 proceeds to step S211, and executes steps S211 to S214. When there is a failure in the fuel gauges (step S204: Yes), the fuel calculation device 30 proceeds to step S221, and executes steps S221 to S224.

In step S211, the fuel calculation device 30 acquires a measured value of a remaining fuel amount in each fuel container. Specifically, the first remaining fuel amount acquisition unit 42 acquires the measured value of the remaining fuel amount in the first fuel container 12 from the first fuel gauge 22. In addition, the second remaining fuel amount acquisition unit 44 acquires the measured value of the remaining fuel amount in the second fuel container 14 from the second fuel gauge 24. In addition, the third remaining fuel amount acquisition unit 46 acquires the measured value of the remaining fuel amount in the third fuel container 16 from the third fuel gauge 26. The measured value of the remaining fuel amount in each fuel container is output to the remaining fuel amount calculation unit 60. The fuel calculation device 30 proceeds to step S212.

In step S212, the fuel calculation device 30 calculates an estimated value of the remaining fuel amount by subtracting the integral value of the fuel flow rate from a total value of the measured values of the remaining fuel amounts. Specifically, first, the remaining fuel amount calculation unit 60 calculates the total value of the measured values of the remaining fuel amounts based on the measured value of the remaining fuel amount in each fuel container acquired in step S211. Next, the remaining fuel amount calculation unit 60 calculates an estimated value of the remaining fuel amount by subtracting the integral value of the fuel flow rate calculated in step S202, from the total value of the measured values of the remaining fuel amounts. The fuel calculation device 30 proceeds to step S213.

In step S213, the fuel calculation device 30 updates and stores the estimated value of the remaining fuel amount. Specifically, the remaining fuel amount calculation unit 60 temporarily stores the estimated value of the remaining fuel amount calculated in step S212. When the remaining fuel amount calculation unit 60 has already stored the estimated value of the remaining fuel amount, the newly calculated estimated value of the remaining fuel amount is updated and temporarily stored as a latest estimated value of the remaining fuel amount. The fuel calculation device 30 proceeds to step S214.

In step S214, the fuel calculation device 30 causes the measured value of the remaining fuel amount to be displayed in normal display. Specifically, the display control unit 80 causes the remaining fuel amount display portion 92 of the display unit 90 to display the total value of the measured values of the remaining fuel amounts acquired from the remaining fuel amount calculation unit 60. At this time, the display control unit 80 causes the display format display portion 96 to display a frame. The fuel calculation device 30 ends a series of the processes in the flowchart illustrated in FIG. 4, and returns to step S201 and repeatedly executes the processing of the flowchart illustrated in FIG. 4 at the predetermined intervals, for example, until the engine 100 is stopped, the supply of electric power is stopped, or a predetermined operation signal for ending the processing generated by an operation of the pilot or the like is received.

In step S221, the fuel calculation device 30 acquires the estimated value of the remaining fuel amount. Specifically, in the processing of the flowchart illustrated in FIG. 4 which is repeatedly executed, when in step S204, it is first determined that there is a failure, the latest estimated value of the remaining fuel amount calculated in step S212 immediately before the fuel gauge fails is acquired. When it is determined that there has been a failure before and the processes of steps S221 to S224 have been executed, a latest estimated value of the remaining fuel amount recalculated in step S222 is acquired. The fuel calculation device 30 proceeds to step S222.

In step S222, the fuel calculation device 30 recalculates the estimated value of the remaining fuel amount by subtracting the integral value of the fuel flow rate from the estimated value of the remaining fuel amount. Specifically, the remaining fuel amount calculation unit 60 recalculates the new estimated value of the remaining fuel amount by subtracting the integral value of the fuel flow rate calculated in step S202, from the estimated value of the remaining fuel amount acquired in step S221. The fuel calculation device 30 proceeds to step S223.

In step S223, the fuel calculation device 30 updates and stores the estimated value of the remaining fuel amount. Specifically, the remaining fuel amount calculation unit 60 updates and temporarily stores the estimated value of the remaining fuel amount recalculated in step S222, as a latest estimated value of the remaining fuel amount. The fuel calculation device 30 proceeds to step S224.

In step S224, the fuel calculation device 30 causes the estimated value of the remaining fuel amount to be displayed in backup display. Specifically, the display control unit 80 causes the remaining fuel amount display portion 92 of the display unit 90 to display the estimated value of the remaining fuel amount acquired from the remaining fuel amount calculation unit 60. At this time, the display control unit 80 does not cause the display format display portion 96 to display a frame. The fuel calculation device 30 ends a series of the processes in the flowchart illustrated in FIG. 4, and returns to step S201 and repeatedly executes the processing of the flowchart illustrated in FIG. 4 at the predetermined intervals, for example, until the engine 100 is stopped, the supply of electric power is stopped, or a predetermined operation signal for ending the processing generated by an operation of the pilot or the like is received.

In the embodiment described above, when one of the fuel gauges has failed, the display of a remaining fuel amount is performed in backup display in which an estimated value is displayed. However, when the fuel container corresponding to the failed fuel gauge has already been empty, the display may return to normal display. Whether or not the fuel container corresponding to the failed fuel gauge is empty can be determined by the following method.

The remaining fuel amount calculation unit 60 calculates an estimated value of a remaining fuel amount. The estimated value of the remaining fuel amount is an estimated value of a total value of remaining fuel amounts in the fuel containers (the first fuel container 12, the second fuel container 14, and the third fuel container 16) provided in the supply line 10. An estimated value of the remaining fuel amount in the fuel container corresponding to the failed fuel gauge can be calculated by subtracting a remaining fuel amount when a fuel container downstream of the fuel container corresponding to the failed fuel gauge is full, from the estimated value of the total value of the remaining fuel amounts. At this time, when the calculated estimated value is 0 or less, the fuel container corresponding to the failed fuel gauge is empty. Next, a specific example will be described below.

First, a case where the third fuel gauge 26 has failed will be described. The estimated value of the total value of the remaining fuel amounts calculated based on the integral value of the measured fuel flow rate is referred to as $A_{sum}$, the measured value of the remaining fuel amount in the first fuel container 12 measured by the first fuel gauge 22 is referred to as $M_1$, and the measured value of the remaining fuel amount in the second fuel container 14 measured by the second fuel gauge 24 is referred to as $M_2$.

When $A_A$ calculated by the equation represented by $A_A = A_{sum} - M_2 - M_1$ is greater than 0, it can be considered that the fuel remains in the third fuel container 16 corresponding to the failed third fuel gauge 26 and the remaining fuel amount is $A_A$. When $A_A$ calculated by the equation represented by $A_A=A_{sum}-M_2-M_1$ is 0 or less, no fuel remains in the third fuel container 16 corresponding to the failed third fuel gauge 26, and the third fuel container 16 is empty.

When the third fuel container 16 is empty, the total value of the measured values of the remaining fuel amounts can be calculated from the measured value $M_1$ of the remaining fuel amount in the first fuel container 12 measured by the first fuel gauge 22 that is not in failure, and from the measured value $M_2$ of the remaining fuel amount in the second fuel container 14 measured by the second fuel gauge 24 that is not in failure. Therefore, by excluding the third fuel container 16 and the third fuel gauge 26 from the process and by setting "no failure", an actual measured value may be displayed in normal display and the accuracy of the estimated value of the remaining fuel amount for backup can be further improved.

Next, a case where the second fuel gauge 24 has also failed in addition to the third fuel gauge 26 will be described. The estimated value of the total value of the remaining fuel amounts calculated based on the integral value of the measured fuel flow rate is referred to as $A_{sum}$, the measured value of the remaining fuel amount in the first fuel container 12 measured by the first fuel gauge 22 is referred to as $M_1$, and the remaining fuel amount in the second fuel container 14 when full is referred to as $M_{2F}$.

When $A_B$ calculated by the equation represented by $A_B=A_{sum}-M_{2F}-M_1$ is greater than 0, it can be considered that the fuel remains in the third fuel container 16 corresponding to the failed third fuel gauge 26 and the remaining fuel amount is $A_B$. In addition, the second fuel container 14 corresponding to the failed second fuel gauge 24 is full. When $A_B$ calculated by the equation represented by $A_B=A_{sum}-M_{2F}-M_1$ is 0 or less, no fuel remains in the third fuel container 16 corresponding to the failed third fuel gauge 26, and the third fuel container 16 is empty.

When $A_B$ is 0 or less and $A_C$ calculated by the equation represented by $A_C=A_{sum}-M_1$ is greater than 0, it can be considered that the fuel remains in the second fuel container 14 corresponding to the failed second fuel gauge 24 and the remaining fuel amount is $A_C$. When $A_B$ is 0 or less and $A_C$ calculated by the equation represented by $A_C=A_{sum}-M_1$ is 0 or less, no fuel remains in the second fuel container 14 corresponding to the failed second fuel gauge 24, and the second fuel container 14 is empty.

When the second fuel container 14 and the third fuel container 16 are empty, the measured value $M_1$ of the remaining fuel amount in the first fuel container 12 measured by the first fuel gauge 22 that is not in failure is the total value of the measured values of the remaining fuel amounts. Therefore, by excluding the second fuel container 14, the second fuel gauge 24, the third fuel container 16, and the third fuel gauge 26 from the process, and by setting "no failure", an actual measured value may be displayed in normal display, and the accuracy of the estimated value of the remaining fuel amount for backup can be further improved.

Actions and Effects of Embodiment

The fuel calculation device 30, the fuel calculation method, and the program described in the embodiment are assessed, for example, as follows.

The fuel calculation device 30 according to a first aspect includes the remaining fuel amount calculation unit 60 that periodically calculates and stores an estimated value of a remaining fuel amount remaining in each of the fuel containers (the first fuel container 12, the second fuel container 14, and the third fuel container 16) based on a measured value of the remaining fuel amount and a fuel flow rate of the fuel supplied from the fuel containers; the failure determination unit 70 that determines whether or not each of the fuel gauges (the first fuel gauge 22, the second fuel gauge 24, and the third fuel gauge 26) that output the measured values of the remaining fuel amounts is in failure; and the display control unit 80 that performs control to cause the measured value of the remaining fuel amount to be displayed when none of the fuel gauges is in failure and to cause the estimated value of the remaining fuel amount to be displayed when any of fuel gauges is in failure.

The fuel calculation device 30 according to the first aspect periodically calculates the estimated value of the remaining fuel amount for backup used when any of the fuel gauges has failed. Since the estimated value of the remaining fuel amount is calculated based on the measured value of the remaining fuel amount and the fuel flow rate at the time of calculation, compared to the case of calculating an estimated value by subtracting a cumulative value of the fuel flow rate supplied, from an initial remaining fuel amount, the error between the estimated value and an actual remaining fuel amount can be reduced. Therefore, since the fuel calculation device 30 can improve the accuracy of the estimated value of the remaining fuel amount calculated when any of the fuel gauges has failed, the pilot or the like can accurately assess the remaining fuel amount.

In the fuel calculation device 30 according to a second aspect, the remaining fuel amount calculation unit 60 calculates the estimated value of the remaining fuel amount by subtracting an integral value of the fuel flow rate from the measured value of the remaining fuel amount. Namely, since the estimated value of the remaining fuel amount is calculated by subtracting the integral value of the fuel flow rate from the measured value of the remaining fuel amount at the time of calculation, like the flow rate method in which the integral value of the fuel flow rate supplied is subtracted from the initial remaining fuel amount, the error between the fuel flow rate actually supplied and the integral value of the fuel flow rate is not accumulated. Therefore, since the error between the estimated value of the remaining fuel amount and the actual remaining fuel amount can be reduced, the accuracy of the estimated value of the remaining fuel amount calculated when any of the fuel gauges has failed can be improved, so that the pilot or the like can accurately assess the remaining fuel amount.

In the fuel calculation device 30 according to a third aspect, when any of the fuel gauges (at least one of the first fuel gauge 22, the second fuel gauge 24, and the third fuel gauge 26) is in failure, the remaining fuel amount calculation unit 60 recalculates and stores a new estimated value of the remaining fuel amount based on the stored estimated value of the remaining fuel amount and the fuel flow rate. In this way, even after any of the fuel gauges has failed, the remaining fuel amounts remaining in the fuel containers can be continuously assessed by updating the estimated value of the remaining fuel amount.

A fuel calculation method according to a fourth aspect includes: a step of periodically calculating and storing an estimated value of a remaining fuel amount remaining in a fuel container based on a measured value of the remaining fuel amount and a fuel flow rate of fuel supplied from the fuel container; a step of determining whether or not a fuel gauge that outputs the measured value of the remaining fuel amount is in failure; and a step of causing the measured value of the remaining fuel amount to be displayed when the fuel gauge is not in failure, and causing the estimated value of the remaining fuel amount to be displayed when the fuel gauge is in failure.

In the fuel calculation method according to the fourth aspect, the estimated value of the remaining fuel amount for backup used when the fuel gauge has failed is periodically calculated. Since the estimated value of the remaining fuel amount is calculated based on the measured value of the remaining fuel amount and the fuel flow rate at the time of calculation, compared to the case of calculating an estimated value by subtracting a cumulative value of the fuel flow rate supplied, from an initial remaining fuel amount, the error between the estimated value and an actual remaining fuel amount can be reduced. Therefore, since the fuel calculation method can improve the accuracy of the estimated value of the remaining fuel amount calculated when the fuel gauge has failed, the pilot or the like can accurately assess the remaining fuel amount.

A program according to a fifth aspect causes a computer that operates as the fuel calculation device 30, to execute: a step of periodically calculating and storing an estimated value of a remaining fuel amount remaining in a fuel container based on a measured value of the remaining fuel amount and a fuel flow rate of fuel supplied from the fuel container; a step of determining whether or not a fuel gauge that outputs the measured value of the remaining fuel amount is in failure; and a step of causing the measured value of the remaining fuel amount to be displayed when the fuel gauge is not in failure, and causing the estimated value of the remaining fuel amount to be displayed when the fuel gauge is in failure.

The program according to the fifth aspect periodically calculates the estimated value of the remaining fuel amount for backup used when the fuel gauge has failed. Since the estimated value of the remaining fuel amount is calculated based on the measured value of the remaining fuel amount and the fuel flow rate at the time of calculation, compared to the case of calculating an estimated value by subtracting a cumulative value of the fuel flow rate supplied, from an initial remaining fuel amount, the error between the estimated value and an actual remaining fuel amount can be reduced. Therefore, since the program can cause the computer that operates as the fuel calculation device 30, to improve the accuracy of the estimated value of the remaining fuel amount calculated when the fuel gauge has failed, the pilot or the like can accurately assess the remaining fuel amount.

The embodiment of the present disclosure has been described above; however, the embodiment is not limited by the described contents of the embodiment. In addition, the present disclosure has illustrated the method for calculating the estimated value of the remaining fuel amount each time in the case of a failure of the fuel gauge; however, the present disclosure may be applied to, for example, a weight management system, a navigation system, and the like of the aircraft, and calculate the weight, the center of gravity, the direction, the position, and the like of the aircraft each time in the case of a failure of each instrument.

REFERENCE SIGNS LIST

1 Fuel management system
10 Supply line
12 First fuel container
14 Second fuel container
16 Third fuel container
20 Fuel flow meter
22 First fuel gauge
24 Second fuel gauge
26 Third fuel gauge
30 Fuel calculation device
40 Fuel flow rate acquisition unit
42 First remaining fuel amount acquisition unit
44 Second remaining fuel amount acquisition unit
46 Third remaining fuel amount acquisition unit
52 First failure information acquisition unit
54 Second failure information acquisition unit
56 Third failure information acquisition unit
60 Remaining fuel amount calculation unit
70 Failure determination unit
80 Display control unit
90 Display unit
92 Remaining fuel amount display portion
94 Unit display portion
96 Display format display portion
100 Engine
Steps S201 to S204, S211 to S214, S221 to S224

The invention claimed is:

1. A fuel management system comprising:
a plurality of fuel containers connected in series via a supply line to supply fuel to an engine;
a plurality of fuel gauges, each of the plurality of fuel containers having a respective one of the plurality of fuel gauges associated therewith;
a remaining fuel amount calculation unit that periodically calculates and stores an estimated current total measured value of a remaining fuel amount remaining in the plurality of fuel containers based on a previous total measured value of the remaining fuel amount remaining in the plurality of fuel containers and a fuel flow rate of fuel supplied from the plurality of fuel containers;
a failure determination unit that determines whether any of the plurality of fuel gauges that output a measured actual value of the remaining fuel amount is in failure; and
a display control unit that performs control to perform:
a normal display to display an actual total measured value of the remaining fuel amount when none of the plurality of fuel gauges is in failure, and
a backup display to display an estimated total measured value of the remaining fuel amount when at least one of the plurality of fuel gauges is in failure;
wherein the remaining fuel amount calculation unit is configured to use a determination formula to determine whether a respective one of the plurality of fuel containers associated with a failed one of the plurality of fuel gauges is empty based on an upstream or downstream positional relationship of all of the plurality of fuel containers connected in series, and
wherein the display control unit is configured to:
perform the normal display of the actual total measured value of the remaining fuel amount even if at least one of the plurality of fuel gauges is determined to have failed if the respective one of the fuel containers associated with the failed at least one of the plurality of fuel gauges is determined to be empty by the determination formula, and
perform the backup display of the estimated total measured value of the remaining fuel amount if at least one of the plurality of fuel gauges is determined to have failed and the respective one of the fuel containers associated with the failed at least one of the plurality of fuel gauges is determined to not be empty by the determination formula.

2. The fuel management system according to claim 1, wherein the remaining fuel amount calculation unit calculates the estimated current total measured value of the remaining fuel amount by subtracting an integral value of the fuel flow rate from the previous total measured value of the remaining fuel amount.

3. The fuel management system according to claim 1, wherein, when any of the plurality of fuel gauges is in failure, the remaining fuel amount calculation unit recalculates and stores a new estimated current total measured value of the remaining fuel amount based on the estimated previous total measured value of the remaining fuel amount and the fuel flow rate.

4. A fuel management method comprising:
periodically calculating and storing an estimated current total measured value of a remaining fuel amount remaining in a plurality of fuel containers connected in series via a supply line, each of the plurality of fuel containers having a respective one a plurality of fuel gauges associated therewith, the calculating and storing being based on a previous total measured value of the remaining fuel amount remaining in the plurality of fuel containers and a fuel flow rate of fuel supplied from the plurality of fuel containers;
determining whether any of the plurality of fuel gauges that output a measured actual value of the remaining fuel amount is in failure;
causing the remaining fuel amount to be displayed;
as a normal display of an actual total measured value of the remaining fuel amount when none of the plurality of fuel gauges is in failure, and
as a backup display of an estimated total measured value of the remaining fuel amount when at least one of the plurality of fuel gauges is in failure; and
using a determination formula to determine whether a respective one of the plurality of fuel containers associated with a failed one of the plurality of fuel gauges is empty based on an upstream or downstream positional relationship of all of the plurality of fuel containers connected in series,
wherein the remaining fuel amount is displayed:
as the normal display of the actual total measured value of the remaining fuel amount even if at least one of the plurality of fuel gauges is determined to have failed if the respective one of the fuel containers associated with the failed at least one of the plurality of fuel gauges is determined to be empty by the determination formula, and
as the backup display of the estimated total measured value of the remaining fuel amount if at least one of the plurality of fuel gauges is determined to have failed and the respective one of the fuel containers associated with the failed at least one of the plurality of fuel gauges is determined to not be empty by the determination formula.

5. A non-transitory computer-readable storage medium storing a program causing a computer to operate a fuel management system to perform:
periodically calculating and storing an estimated current total measured value of a remaining fuel amount remaining in a plurality of fuel containers connected in series via a supply line, each of the plurality of fuel containers having a respective one a plurality of fuel gauges associated therewith, the calculating and storing being based on a previous total measured value of the remaining fuel amount remaining in the plurality of fuel containers and a fuel flow rate of fuel supplied from the plurality of fuel containers;
determining whether any of the plurality of fuel gauges that output a measured actual value of the remaining fuel amount is in failure;
causing the remaining fuel amount to be displayed;
as a normal display of an actual total measured value of the remaining fuel amount when none of the plurality of fuel gauges is in failure, and
as a backup display of an estimated total measured value of the remaining fuel amount when at least one of the plurality of fuel gauges is in failure; and
using a determination formula to determine whether a respective one of the plurality of fuel containers associated with a failed one of the plurality of fuel gauges is empty based on an upstream or downstream positional relationship of all of the plurality of fuel containers connected in series,
wherein the remaining fuel amount is displayed:
as the normal display of the actual total measured value of the remaining fuel amount even if at least one of the plurality of fuel gauges is determined to have failed if the respective one of the fuel containers associated with the failed at least one of the plurality of fuel gauges is determined to be empty by the determination formula, and
as the backup display of the estimated total measured value of the remaining fuel amount if at least one of the plurality of fuel gauges is determined to have failed and the respective one of the fuel containers associated with the failed at least one of the plurality of fuel gauges is determined to not be empty by the determination formula.

* * * * *